United States Patent
Campbell, Jr. et al.

[15] 3,638,243
[45] Feb. 1, 1972

[54] SURGICALLY IMPLANTABLE PROSTHETIC JOINT

[72] Inventors: William B. Campbell, Jr., Columbus, Ohio; Jack E. Burroughs, Fort Worth, Tex.; Joe K. Cochran, Jr., Columbus, Ohio

[73] Assignee: The Ohio State University, Columbus, Ohio

[22] Filed: May 4, 1970

[21] Appl. No.: 34,173

[52] U.S. Cl. .................................3/1, 128/92 C, 287/12
[51] Int. Cl. ..........................................................A61f 1/24
[58] Field of Search ...................3/1; 128/92 R, 92 C, 92 CA, 128/92 BA, 92 BC; 287/12, 21

[56] References Cited

UNITED STATES PATENTS

| | | | |
|---|---|---|---|
| 3,506,982 | 4/1970 | Steffee | .................................3/1 |
| 2,422,302 | 6/1947 | Horn | .................................3/1 UX |
| 3,459,180 | 8/1969 | Ross | .................................128/92 BA |

*Primary Examiner*—Richard A. Gaudet
*Assistant Examiner*—Ronald L. Frinks
*Attorney*—William S. Rambo

[57] ABSTRACT

A surgically implantable hinge joint for replacing a damaged or diseased natural hinge joint in the skeletal structure of humans and other animals and composed of relatively rotatable ball- and socket-members each having elongate shank portions for implantation in the proximal end portions of the bones which are severed from the removed natural joint, and which provides for at least limited axial rotation of one of the joint members relative to the other together with relative hinging or pivotal swinging movement of such members in a given plane.

2 Claims, 4 Drawing Figures

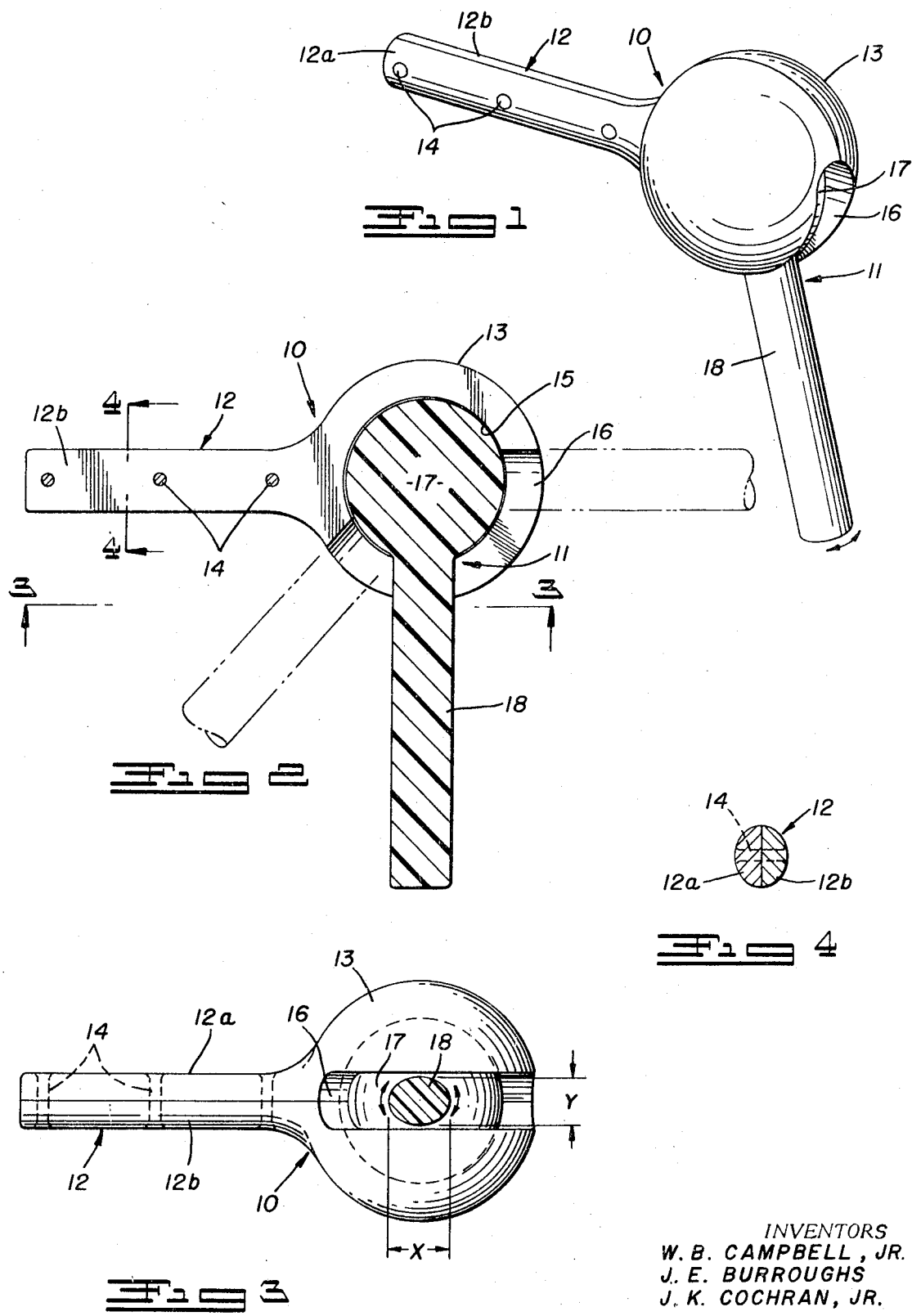

SURGICALLY IMPLANTABLE PROSTHETIC JOINT

BACKGROUND OF THE INVENTION

This invention relates generally to prosthesis and more specifically to surgically implantable prosthetic joints for replacement of natural hinge-type joints, such as the knee, elbow, finger and toe joints of the human skeleton.

In the past, various different types of prosthetic hinge pin-type joints have been proposed, but by and large, such prior art joints have met with limited success due to their inability to provide for limited axial rotation as well as hinging movement between the proximal members of the joint. Also, a prosthetic hinge joint which is characterized by a fixed axis hinge pin presents difficulties in implantation and correct rotational alignment of the adjoining bones.

SUMMARY AND OBJECTS OF THE INVENTION

The present invention provides a modified ball- and socket-type prosthetic joint which features relative axial rotation or axial oscillation as well as hinging or pivotal movement in a given plane between the ball-and-socket members. This dual movement or action is made possible by employing a socket member having a bone-implantable shank and a hollow socket-forming head formed with an equatorial or circumferentially disposed arcuate slot of limited length and width communicating with an internal, generally spherical chamber, and a ball member rotatively mounted in the spherical chamber of the socket member and formed or otherwise provided with a radially extended shank or shaft which projects outwardly through the slot for implantation in a second, adjoining bone. The dimensions and shape of the slot of the socket member and the shank of the ball member are such as to provide for relative hinging movement of the bone-implantable shanks of the ball-and-socket members in a given plane, while at the same time permitting of limited axial rotation of one of the implantable shanks relative to the other.

The primary object of this invention is to provide a surgically implantable prosthetic joint which is capable of simulating the movements and stability of the natural joint which it replaces, and which greatly simplifies the operational techniques required in the surgical implantation of previously known types of prosthetic hinge joints.

BRIEF DESCRIPTION OF THE DRAWINGS

In the accompanying drawings, a single preferred embodiment of the invention is illustrated as follows:

FIG. 1 is a perspective view of a prosthetic joint according to the present invention;

FIG. 2 is a medial, longitudinal, vertical sectional view taken through the joint of FIG. 1 and showing the opposite, bone-implantable shanks disposed in 90° angular relationship;

FIG. 3 is a horizontal sectional view taken along the line 3—3 of FIG. 2; and

FIG. 4 is a transverse vertical sectional view taken along the line 4—4 of FIG. 2.

DESCRIPTION OF PREFERRED EMBODIMENT

With reference to the drawings, it will be noted that the present prosthetic joint is composed of a socket member indicated generally by the reference numeral 10, and a ball member generally designated 11. These members may be formed from various rigid materials which are compatible with and nontoxic to body tissues, such as certain metals, metallic alloys, plastics (synthetic resins) and ceramics, or combinations of such materials. For example, and without limitation, the socket member 10 may be formed from a stainless steel, while the ball member 11 may be of molded plastic composition.

The socket member 10 is formed to include an elongated, bone-implantable shank portion 12 and a relatively enlarged, hollow end or head portion 13. The socket member 10 is preferably of sectional construction and may, for example, be composed of two half-sections 12a and 12b which, upon assembly of the joint, are rigidly and securely fastened together, such as by a series of rivets 14. The head portion 13 of the socket member 10 is formed to define a generally spherical, internal chamber 15 and a segmental arcuate slot 16 communicating with the chamber 15 and opening outwardly of the head portion 13. The slot 16 extends circumferentially or equatorially of the head portion 13 through an arc of at least 90°, and may extend through a greater arc if desired, as indicated in FIGS. 2 and 3. The slot 16 is disposed in a common plane with and parallel to the axis of the shank portion 12.

The ball member 11 of the joint is preferably a solid, one-piece body formed with a generally spherical head portion 17 rotatively carried within the chamber 15 of the socket member 10, and an elongated shank or shaft portion 18 which extends radially outwardly through the slot 16 of the socket member.

For reasons which will be hereinafter more fully explained, the shank portions 12 and 18 of the socket and ball members are preferably elliptical or otherwise noncircular in cross section as indicated particularly in FIGS. 3 and 4. For example, the shaft or shank 18 of the ball member 11 is elliptical in transverse cross section and has a major width dimension X slightly greater than the width of the slot 16 and a minor width dimension Y slightly less than the width of the slot 16. This arrangement thus limits the extent of axial rotation of the shank 18 and spherical head 17 relative to the socket member 10, while at the same time permitting limited axial rotation or axial oscillation of the shank 18 in either direction. It will be understood, however, that the differential in the width of the slot 16 and the minor width dimension Y of the shank 18 is relatively slight, in order to prevent any substantial pivotal movement of the shank 18 in a lateral or transverse plane relative to the slot 16.

In the surgical implantation of the present prosthetic joint, the shanks 12 and 18 are sequentially implanted into the axial tissue of the proximal end portions of a pair of relatively adjoining bones following surgical removal of the remains of the damaged or diseased natural joint. The shanks 12 and 18 are preferably forcibly driven into axial openings or bores formed in the proximal ends of the bones by hammer blows applied against the enlarged end portion 13 of the socket section. The ambient muscles are then repaired and restored to their approximate natural positions and will then function to hold the implanted shanks against accidental displacement from the bones. It is here important to note that the axial rotability of the shank 18, albeit limited, serves to compensate for any minor rotational misalignment of the adjoining bones which might result during the implantation of the shanks in their respective bones. This greatly facilitates and speeds the overall implantation operation and reduces the incidence of misalignment heretofore resulting from surgical implantation of previously known prosthetic joints.

Further, the noncircular cross-sectional configuration of the bone-implantable shanks of the present joint serves to minimize the possibility of relative rotational movement between the shanks and their bones following implantation of the shanks in the bones.

It will be understood that the present prosthetic joint may be fabricated in various sizes and shapes depending upon the particular skeletal joint it is intended to replace. Thus, with appropriate variations in size, the present prosthetic joint may be used to replace a natural knee, elbow, finger or toe joint, or generally any hinge-type joint in an animal skeleton.

Limitations to the extent of axial rotation and pivotal movement of the shank 18 of the ball member 11 of the joint may be readily established simply by varying the length and width dimensions of the slot 16 and of the size and configuration of the shank 18 in the region thereof adjacent the slot 16.

In view of the foregoing, it will be seen that the present invention provides an improved, surgically implantable prosthetic hinge joint which provides for relative axial rotation as well as pivotal swinging movement between the respective joint members while at the same time providing stability against undesired pivoting of the joint members in nonparallel planes.

While a single preferred embodiment of the invention has been illustrated and described in detail, it will be understood that various modifications in constructional details, materials, and design are possible without departing from the spirit of the invention or the scope of the following claims.

We claim:

1. A surgically implantable prosthetic joint for replacement of a natural hinge joint between proximal ends of two bones, comprising: a rigid socket member having an elongated shank portion for surgical implantation in a proximal end portion of a first bone and a relatively enlarged, hollow head portion defining a spherical, internal chamber and an outwardly opening, arcuate slot communicating with said chamber and disposed in a common plane with the axis of the shank portion of said socket member; and a rigid ball member having a spherical head portion conforming to and rotatively carried within the chamber of said socket member and an elongated shank portion extending outwardly through the arcuate slot of said socket member for surgical implantation in a proximal end portion of a second bone, the shank portion of said ball member, at least in the region thereof disposed in said slot, being of elliptical cross section and having a minor width dimension slightly less than the width of said slot and a major width dimension slightly greater than the width of said slot, whereby to permit relative axial oscillation, as well as pivotal swinging movement between said socket and ball members.

2. A prosthetic joint according to claim 1, wherein said socket member is composed of two half-sections secured to one another.

* * * * *